United States Patent
Nakano et al.

(10) Patent No.: US 6,805,920 B2
(45) Date of Patent: Oct. 19, 2004

(54) POLYMERIZABLE LIQUID CRYSTAL COMPOUND AND OPTICAL FILM

(75) Inventors: Shusaku Nakano, Ibaraki (JP); Amane Mochizuki, Ibaraki (JP); Yukiharu Iwaya, Hiratsuka (JP); Shinya Yamada, Hiratsuka (JP); Tsutomu Hashimoto, Hiratsuka (JP); Yuji Nakayama, Hiratsuka (JP); Yoshiki Hasegawa, Hiratsuka (JP); Ken Suzuki, Hiratsuka (JP); Tohru Kobayashi, Hiratsuka (JP)

(73) Assignees: Nitto Denko Corporation, Osaka (JP); Takasago International Corporation, Tokyo (JP)

( * ) Notice: Subject to any disclaimer, the term of this patent is extended or adjusted under 35 U.S.C. 154(b) by 65 days.

(21) Appl. No.: 10/121,771

(22) Filed: Apr. 11, 2002

(65) Prior Publication Data

US 2003/0072893 A1 Apr. 17, 2003

(30) Foreign Application Priority Data

Apr. 12, 2001 (JP) ........................................ 2001-113420

(51) Int. Cl.⁷ ........................ C09K 19/20; C09K 19/38; C07C 69/78; C07C 69/84; G02F 1/133
(52) U.S. Cl. .................... 428/1.1; 428/1.3; 252/299.01; 252/299.67; 252/299.7; 349/117; 349/127; 560/83; 560/85; 570/129; 570/138
(58) Field of Search ........................ 252/299.01, 299.67, 252/299.7; 560/83, 85; 570/129, 138; 349/117, 127, 123; 428/1.1, 1.3

(56) References Cited

U.S. PATENT DOCUMENTS

| 6,180,024 B1 | 1/2001 | Blackwood et al. ... 252/299.01 |
| 6,217,955 B1 | 4/2001 | Coates et al. .............. 428/1.31 |

FOREIGN PATENT DOCUMENTS

| JP | 7-82183 | 3/1995 |
| JP | 7-294735 | 11/1995 |
| JP | 8-311 | 1/1996 |
| JP | 8-41461 | 2/1996 |
| JP | 11-148079 | 6/1999 |
| JP | 2000-281629 | 10/2000 |
| WO | WO 97/35219 | 9/1997 |

OTHER PUBLICATIONS

English translation by computer for JP 2000–336362, http://www6.ipdi.jpo.go.jp/Tokujitu/PAJdetail.ipdl?N0000=80&N0120=01&N2001=2&N3001=2000–336362.*

* cited by examiner

Primary Examiner—Shean C. Wu
(74) Attorney, Agent, or Firm—Knobbe, Martens, Olson & Bear, LLP

(57) ABSTRACT

This invention provides a polymerizable liquid crystal compound having a large value of $\Delta n/n$, excellent in coating properties on an alignment film and easily aligned. Disclosed is a polymerizable liquid crystal compound having at least one polymerizable reactive group and showing nematic liquid crystal properties, having a $\Delta n/n$ value of 0.14 or more wherein n is average refractive index and $\Delta n$ is extraordinary light refractive index (ne) minus ordinary light refractive index (no), and being aligned by application onto an alignment film.

30 Claims, No Drawings

POLYMERIZABLE LIQUID CRYSTAL COMPOUND AND OPTICAL FILM

BACKGROUND OF THE INVENTION

1. Field of the Invention

This invention relates to a novel polymerizable liquid crystal compound, a liquid crystal composition comprising the same, and an optical film obtained from the liquid crystal composition. The optical film is used by integrating it as various kinds of retardation film (optical compensation film) or as a cholestericpolarizer into a liquid crystal display (LCD).

2. Description of the Related Art

Conventionally, an optical film such as optical compensation plate used in liquid crystal displays makes use of a birefringent film produced by subjecting a polymeric film to stretching treatment, but recently a liquid crystal alignment film comprising a liquid crystal polymer or a liquid crystal compound having polymerizable functional groups has been developed in order to achieve an advanced alignment which cannot be achieved by stretching treatment, that is, alignment such as tilted alignment and twisted alignment.

Further, a cholesteric polarizer utilizing the selective reflection properties of a liquid crystal alignment film (selective reflection film) obtained from a cholesteric alignment composition comprising a liquid crystal polymer or a polymerizable liquid crystal compound combined with a chiral compound is also practically used. Among the selective reflection properties, the selective reflection central wavelength $\lambda$ is represented by the equation $\lambda = n \times P$ wherein n is average refractive index, and P is cholesteric pitch, and the selective reflection wavelength width $\Delta\lambda$ is represented by the equation $\Delta\lambda = \Delta n \times P$ wherein $\Delta n$ is extraordinary light refractive index (ne) minus ordinary light refractive index (no). Accordingly, the selective reflection wavelength width $\Delta\lambda$ is represented by the equation of $\Delta\lambda = \Delta n \times P = \Delta n/n \times \lambda$. That is, the selective reflection wavelength width $\Delta\lambda$ is determined by the $\Delta n/n$ of the film material.

When the selective reflection film is used as a cholesteric polarizer in LCD, it should cause selective reflection in the visible light range, but usually the selective reflection wavelength width $\Delta\lambda$ of one selective reflection film is narrower than the visible light zone, and thus a plurality of selective reflection films are laminated in order to broaden the selective reflection wavelength width $\Delta\lambda$. Accordingly, when a material having a narrow selective reflection wavelength width $\Delta\lambda$ is used in a selective reflection film, the number of films laminated should be increased thus resulting in the problem of lower productivity. Under these circumstances, there is demand for a material having a broad selective reflection wavelength width $\Delta\lambda$, that is, a material (e.g. a polymerizable liquid crystal compound) having a large value of $\Delta n/n$. When sandwiched between two alignment films in LCD, a known polymerizable compound or composition having a large value of $\Delta n/n$ is aligned; however, when applied onto an alignment film, the compound or composition is poor in orientability or in solubility and coating properties, thus failing to form a film. Accordingly, a practically usable selective reflection film cannot be easily obtained.

SUMMARY OF THE INVENTION

An object of this invention is to provide a polymerizable liquid crystal compound having a large value of $\Delta n/n$, excellent in coating properties on an alignment film and easily aligned, as well as a liquid crystal composition comprising the polymerizable liquid crystal compound. Another object of this invention is to provide an optical film consisting of a liquid crystal alignment film obtained from the polymerizable liquid crystal compound or the liquid crystal composition, a selective reflection film selecting from the optical film, and a liquid crystal display comprising the optical film integrated therein.

To solve the problem described above, the present inventors made extensive study on various polymerizable liquid crystal compounds, and as a result, they found the following polymerizable liquid crystal compound, thus arriving at completion of this invention.

That is, this invention relates to a polymerizable liquid crystal compound having at least one polymerizable reactive group and showing nematic liquid crystal properties, wherein said compound has a $\Delta n/n$ value of 0.14 or more wherein n is average refractive index and $\Delta n$ is extraordinary light refractive index (ne) minus ordinary light refractive index (no), and is aligned by application onto an alignment film.

The polymerizable liquid crystal compound has a $\Delta n/n$ value as high as 0.14 or more, and is excellent in coating properties and alignment properties on an alignment film. It is noted that $\Delta n/n$ is equal to $\Delta\lambda/\lambda$, and the value of $\Delta n/n$ can also be determined from the selective reflection central wavelength ($\lambda$) and the selective reflection wavelength width ($\Delta\lambda$) of the liquid crystal alignment film (selective reflection film) obtained from the polymerizable liquid crystal compound.

Further, this invention relates to a liquid crystal composition comprising the polymerizable liquid crystal compound.

Further, this invention relates to a liquid crystal composition comprising the polymerizable liquid crystal compound and a chiral compound.

The polymerizable liquid crystal compound can also be used in a liquid crystal composition, and upon incorporating a chiral compound for bringing about cholesteric liquid crystal properties, the polymerizable liquid crystal compound serves as a composition capable of cholesteric alignment.

The liquid crystal composition of this invention can further comprise a multifunctional (meth)acrylate compound having two or more (meth)acryloyloxy groups.

By incorporating the multifunctional (meth)acrylate compound having two or more (meth)acryloyloxy groups into the liquid crystal compound, the cured product thereof (liquid crystal alignment film) can further improve heat resistance and solvent resistance.

The liquid crystal composition comprising the polymerizable liquid crystal compound, the multifunctional (meth)acrylate compound having two or more (meth)acryloyloxy groups and a chiral compound can be used as a liquid crystal composition for producing a cholesteric liquid crystal film.

The liquid crystal composition comprising the polymerizable liquid crystal compound, the multifunctional (meth)acrylate compound having two or more (meth)acryloyloxy groups and a chiral compound can be used as a cholesteric liquid crystal composition for circular-dichroic optics.

Further, this invention relates to an optical film consisting of a liquid crystal alignment film obtained by coating an alignment film with the polymerizable liquid crystal compound or the liquid crystal composition, heat-orienting it and allowing (meth) acryloyloxy groups thereof to react in order to fix the alignment structure.

The liquid crystal alignment film obtained by orienting the polymerizable liquid crystal compound or liquid crystal composition and fixing the alignment thereof is also useful as various kinds of optical film. Out of the optical films described above, the optical film obtained from the liquid crystal composition comprising the polymerizable liquid crystal compound and a chiral compound is useful as a selective reflection film. Further, the selective reflection film can be laminated on a retardation film to form a cholesteric polarizer. Further, the optical film can be used after it is integrated in a usual manner into LCD.

As the Δn/n is increased, the selective reflection wavelength width Δλ is made broader, and the number of film layers laminated for a broader range of the selective reflection film can be reduced. When the Δn/n is not less than 0.14, the visible-light region of from 400 to 700 nm can be covered by 4 layers. When the Δn/n is not less than 0.18, the visible light region can be covered by 3 layers.

DETAILED DESCRIPTION OF THE INVENTION

The polymerizable liquid crystal compound of this invention includes e.g. the liquid crystal (meth)acrylate compounds represented by the general formula (1):

(1)

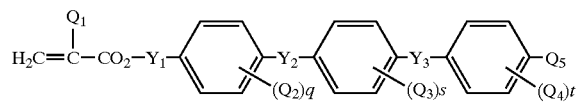

wherein $Y_1$ represents $-C_nH_{2n}-$, $-C_nH_{2n}O-$ or $-(C_mH_{2m}O)_p-$ whereupon is an integer of 2 to 12, m is an integer of 2 to 6, and p is an integer of 2 to 6; $Y_2$ and $Y_3$ represent $-CO_2-$, $-OCO-$, $-C\equiv C-$ or a single bond provided $Q_1$ represents $-H$ or $-CH_3$; $Q_2$, $Q_3$ and $Q_4$ independently represent $-F$, $-Cl$, $-H$, $-CH_3$, $-C_2H_5$ or $-OCH_3$; $Q_5$ represents $-CN$, $-F$ or $-OC_vH_{2v+1}$ whereupon V is an integer of 1 to 6; and q, s and t independently represent 1 or 2.

As the liquid crystal (meth)acrylate compounds represented by the general formula (1) above, those of the above structural formula can be used without limitation, among which the liquid crystal (meth) acrylate compounds used preferably in respect of solubility, coating properties and alignment are those represented by the general formula (2):

(2)

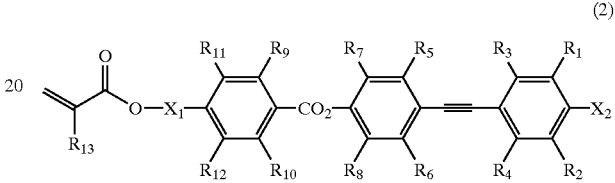

wherein $R_1$ to $R_{12}$ are the same or different and each represent $-F$, $-H$, $-CH_3$, $-C_2H_5$ or $-OCH_3$; $R_{13}$ represents $-H$ or $-CH_3$; $X_1$ represents a bifunctional group represented by the formula $-(CH_2CH_2O)_a(CH_2)_b(O)_c-$ wherein a is an integer of 0 to 3, b is an integer of 0 to 12, and c is 0 or 1 provided that when a is an integer of 1 to 3, b is 0 and c is 0 and when a is 0, b is an integer of 1 to 12, and c is 1; and $X_2$ represents $-CN$ or $-F$.

Examples of the liquid crystal (meth)acrylate compounds represented by the general formula (2) are shown in Table 1.

TABLE 1

| Exemplary Compounds | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $X_2$ | $X_1$ a | b | c |
|---|---|---|---|---|---|---|---|---|---|---|---|---|---|---|---|---|---|
| 1 | H | H | H | H | H | H | F | H | H | H | H | H | H | CN | 1 | 0 | 0 |
| 2 | H | H | H | H | H | H | F | H | H | H | H | H | H | CN | 0 | 3 | 1 |
| 3 | H | H | H | H | H | H | F | H | H | H | H | H | H | CN | 0 | 4 | 1 |
| 4 | H | H | H | H | CH | H | H | H | H | H | H | H | H | CN | 2 | 0 | 0 |
| 5 | H | H | H | H | H | F | H | H | H | H | H | H | H | CN | 0 | 6 | 1 |
| 6 | CH | H | H | H | H | H | H | H | H | H | H | H | H | CN | 0 | 7 | 1 |
| 7 | H | H | H | H | H | H | F | H | H | H | H | H | H | CN | 0 | 6 | 1 |
| 8 | H | H | H | H | H | H | CH_3 | H | H | H | H | H | H | CN | 1 | 0 | 0 |
| 9 | H | H | H | H | H | H | F | H | H | H | H | H | H | CN | 0 | 10 | 1 |
| 10 | H | H | H | H | H | H | H | H | H | H | H | H | CH | CN | 2 | 0 | 0 |
| 11 | F | F | H | H | H | H | H | H | H | H | H | H | CH | CN | 0 | 6 | 1 |
| 12 | H | H | CH | H | H | H | F | H | H | H | H | H | H | CN | 0 | 8 | 1 |
| 13 | H | H | H | H | H | H | H | H | H | H | H | H | H | CN | 1 | 0 | 0 |
| 14 | H | H | H | H | H | H | H | H | H | H | H | H | H | CN | 2 | 0 | 0 |
| 15 | H | H | H | H | H | H | F | H | H | H | H | H | H | CN | 3 | 0 | 0 |
| 16 | H | H | H | H | H | H | CH_3 | H | H | H | H | H | H | CN | 1 | 0 | 0 |
| 17 | F | F | H | H | H | H | H | H | H | H | H | H | H | CN | 2 | 0 | 0 |
| 18 | F | H | H | H | H | H | H | H | H | H | H | H | H | CN | 2 | 0 | 0 |
| 19 | H | H | H | H | F | H | H | H | H | H | H | H | H | CN | 2 | 0 | 0 |
| 20 | H | H | H | H | H | H | F | H | H | H | H | H | H | CN | 2 | 0 | 0 |
| 21 | H | H | H | H | H | H | CH_3 | H | H | H | H | H | H | CN | 2 | 0 | 0 |
| 22 | F | H | H | H | H | H | H | H | H | H | H | H | H | CN | 3 | 0 | 0 |
| 23 | H | H | H | H | H | CH | H | H | H | H | H | H | H | CN | 1 | 0 | 0 |
| 24 | H | H | F | H | H | H | H | H | H | H | H | H | H | CN | 3 | 0 | 0 |
| 25 | H | H | H | H | H | H | CH_3 | H | H | H | H | H | H | CN | 2 | 0 | 0 |
| 26 | CH | H | H | H | H | H | H | H | H | H | H | H | H | CN | 3 | 0 | 0 |
| 27 | F | H | H | H | H | H | H | H | H | H | H | H | H | CN | 3 | 0 | 0 |
| 28 | H | H | H | H | H | H | F | F | H | H | H | H | H | CN | 2 | 0 | 0 |
| 29 | F | H | H | H | H | H | H | H | H | H | H | H | H | CN | 1 | 0 | 0 |
| 30 | H | H | H | H | H | H | F | H | H | H | H | H | CH | CN | 2 | 0 | 0 |

TABLE 1-continued

| Exemplary Compounds | $R_1$ | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $X_2$ | $X_1$ a | b | c |
|---|---|---|---|---|---|---|---|---|---|---|---|---|---|---|---|---|---|
| 31 | F | H | H | H | H | H | H | H | H | H | H | H | CH | CN | 3 | 0 | 0 |
| 32 | H | H | H | H | H | H | F | H | H | H | H | H | CH | CN | 3 | 0 | 0 |
| 33 | F | H | H | H | H | H | H | H | H | H | H | H | H | CN | 0 | 10 | 1 |
| 34 | H | H | H | H | H | H | H | H | H | H | H | H | H | F | 2 | 0 | 0 |
| 35 | H | H | H | H | H | H | F | H | H | H | H | H | H | F | 2 | 0 | 0 |
| 36 | H | H | H | H | F | H | H | H | H | H | H | H | H | F | 2 | 0 | 0 |
| 37 | H | H | H | H | H | H | $CH_3$ | H | H | H | H | H | H | F | 1 | 0 | 0 |
| 38 | H | H | H | H | H | H | $CH_3$ | H | H | H | H | H | H | F | 2 | 0 | 0 |
| 39 | H | H | H | H | H | H | F | F | H | H | H | H | H | F | 2 | 0 | 0 |
| 40 | F | F | H | H | H | H | H | H | H | H | H | H | H | F | 1 | 0 | 0 |

The polymerizable liquid crystal compounds of this invention are not limited to those exemplified above.

These liquid crystal (meth)acrylate compounds can be synthesized in e.g. the following method.

That is, as shown in scheme (1) below, a phenol derivative (I) protected at the hydroxyl group thereof is converted into compound (IIa) or (IIb) by coupling it with 3-methyl-1-butyne-3-ol or trimethyl silyl acetylene in the presence of a palladium/copper catalyst, and then converted by a base into compound (III) which is further coupled with compound (IV) by a palladium/copper catalyst to form its corresponding tolan derivative (V), followed by removing the protective group to synthesize compound (VII). Alternatively, compound (V) can also be synthesized by converting compound (III) into zinc salt compound (VI) and then coupling this salt with compound (IV) in the presence of a palladium catalyst.

Scheme 1

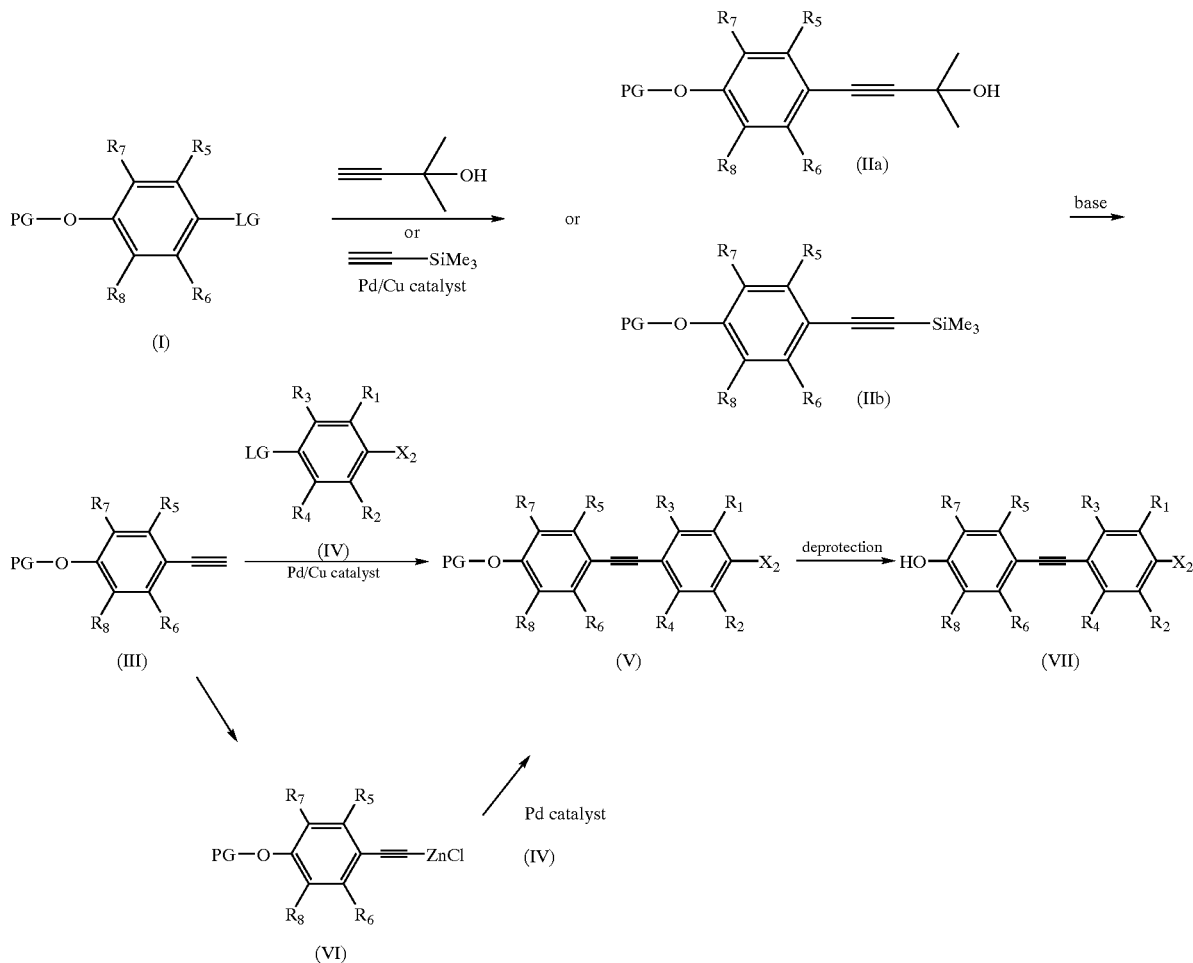

wherein $R_1$ to $R_8$ and $X_2$ have the same meanings as defined above, PG is a protective group, and LG is a leaving group such as —Cl, —Br, —I and oxytrifluoromethane sulfonyl group (OTf).

As shown in scheme (2) below, the tolan derivative (V) in scheme (1) can also be synthesized by coupling compound (IV) with 3-methyl-1-butyne-3-ol or trimethyl silyl acetylene in the presence of a palladium/copper catalyst to form compound (VIII) or (IX), then converting this product into compound (X), followed by coupling reaction thereof with compound (I) in the presence of a palladium/copper catalyst. Alternatively, compound (X) is converted into zinc salt compound (XI) and then coupled with compound (I).

wherein $R_1$ to $R_8$ and $X_2$ have the same meanings as defined above, PG is a protective group, and LG is a leaving group such as —Cl, —Br, —I and oxytrifluoromethane sulfonyl group (OTf).

As shown in scheme (3) below, compound (XIV) obtained by condensing acrylic acid or methacrylic acid (XII) with a benzoic acid derivative represented by formula (XIII) in the presence of an acid catalyst such as p-toluenesulfonic acid or boric acid is subjected to dehydrogenation condensation with compound (VII) in scheme (1) by a dehydrating agent selected from N,N'-dicyclohexyl carbodiimide, 2-chloro-1,3-dimethyl imidazolium chloride, 2-chloro-1-methyl

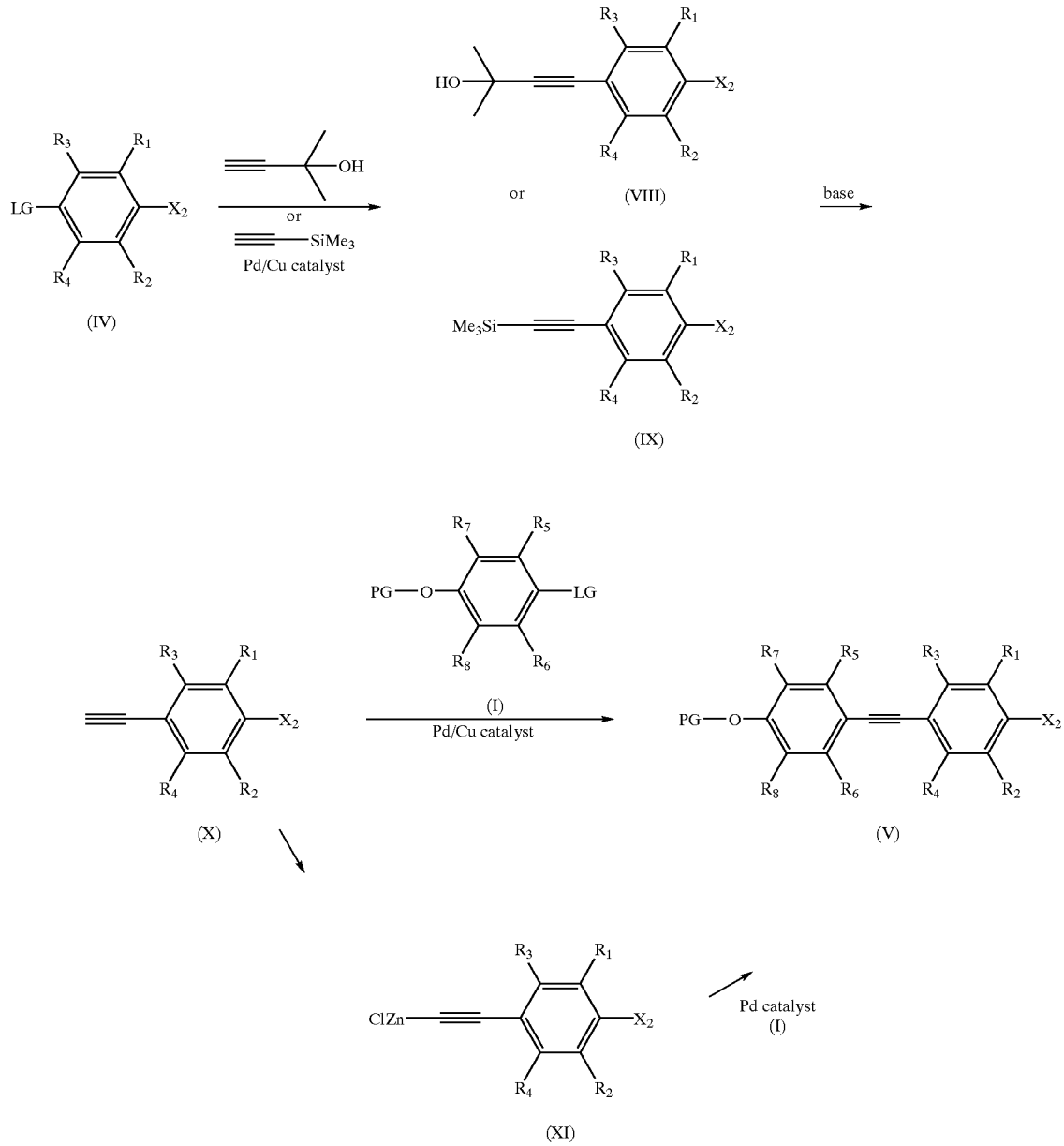

pyridium iodide, and carbonyl imidazole, whereby the liquid crystal (meth)acrylate compound represented by the general formula (2) can be synthesized.

Scheme 3

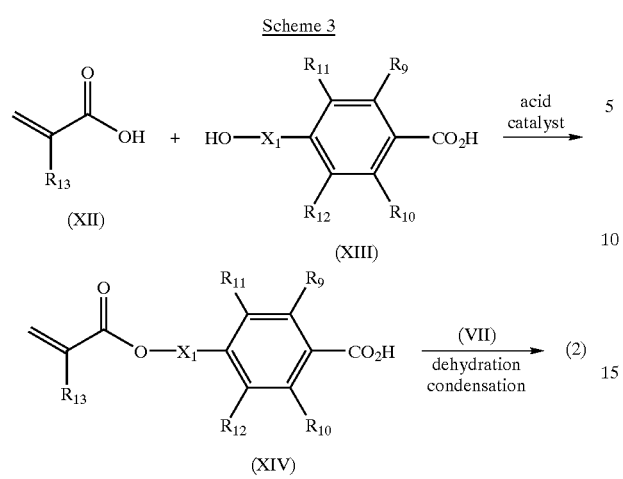

wherein $R_9$ to $R_{13}$ and $X_1$ have the same meanings as defined above.

The liquid crystal composition of this invention is based on a polymerizable liquid crystal compound such as the liquid crystal (meth)acrylate compound represented by the general formula (1). Since this compound is a nematic liquid crystal compound, the compound can exhibit a cholesteric phase by mixing a chiral compound with the compound.

The chiral compound added is not particularly limited insofar it has optically active groups, and when added to the polymerizable liquid crystal compound, does not disturb the alignment. The chiral compound may have or may not have liquid crystallizability, and is preferably a compound having cholesteric liquid crystallizability and characterized by reflecting about half of light of a certain wavelength as right (or left) circularly polarized light while penetrating the other half of the light as left (or right) circularly polarized light, out of the natural incident light parallel to the spiral axis of the Grandjean [phonetic transcription] alignment thereof. The chiral compound used may have or may not have reactive groups, but in view of the heat resistance and solvent resistance of a cured product (liquid crystal alignment film) obtained by curing the liquid crystal composition, the chiral compound is preferably a compound having reactive groups. Examples of the reactive groups are (meth) acryloyloxy group, azide group, epoxy group etc., preferably the same (meth)acryloyloxy group as the polymerizable reactive group of the liquid crystal (meth) acrylate compound. Further, the number of polymerizable reactive groups is preferably two or more in consideration of heat resistance and solvent resistance.

Specifically, the chiral compound having (meth) acryloyloxy groups includes, but is not limited to, the (meth) acrylate compounds represented by the general formula (3):

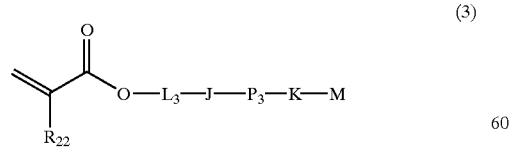

wherein $R_{22}$ represents a hydrogen atom or a methyl group; $L_3$ represents $-(CH_2)_j-$ whereupon j is an integer of 0 to 10, $-(CH_2)_kO-$ whereupon k is an is an integer of 0 to 3; J and K each represent a cyclic substituent group substituted at para-positions (referred to hereinafter as para-substituted cyclic substituent group); $P_3$ represents $-CO_2-$, $-O-$, $-OCO-$, $-CH=CH-$, $-CH\equiv CH-$ or a single bond; and M represents $-CO-R_{23}$ or $-R_{24}$.

The para-substituted cyclic substituent groups J and K include those represented by formula 7:

[Formula 7]

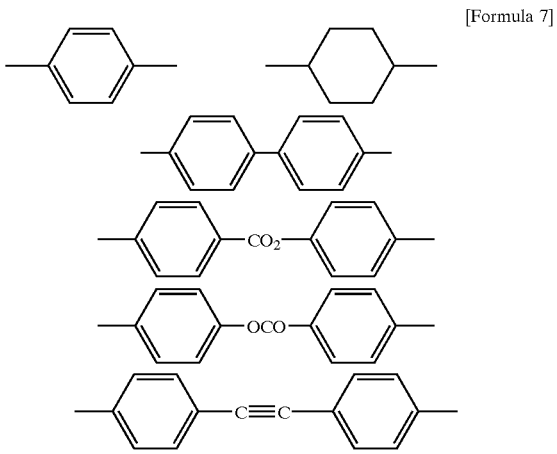

The group $R_{23}$ includes those groups exemplified by formula 8:

[Formula 8]

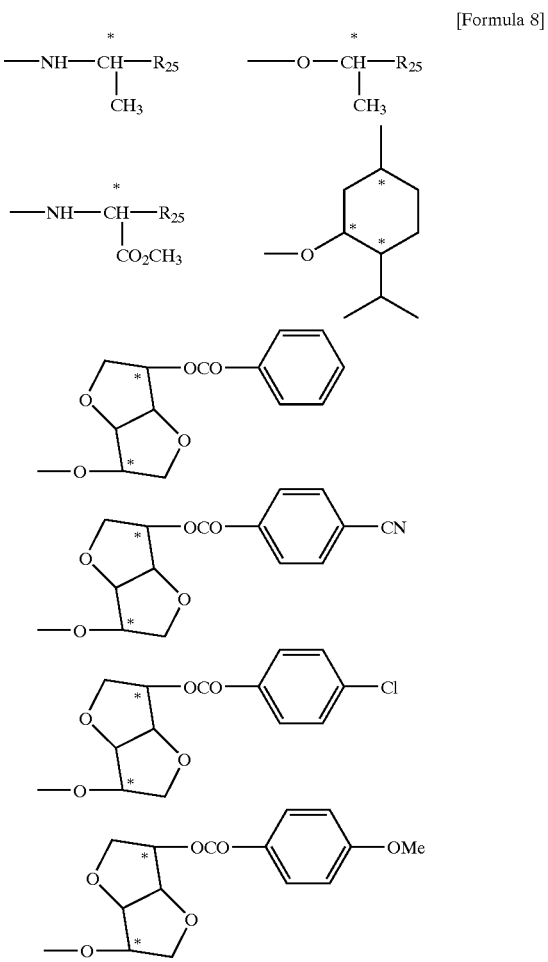

The group $R_{24}$ includes those groups represented by formula 9:

[Formula 9]

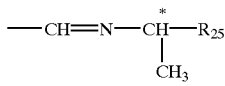
[Formula 9]

$R_{25}$ in $R_{24}$ includes those groups represented by formula 10:

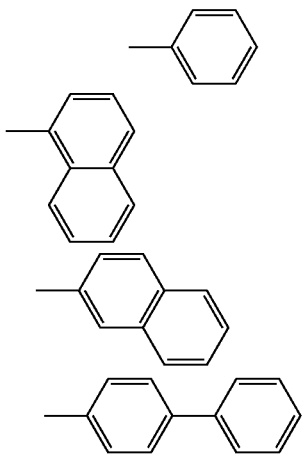
[Formula 10]

Other preferable examples of the chiral compound which can be preferably used include the di (meth) acrylate compounds represented by the following general formula (4):

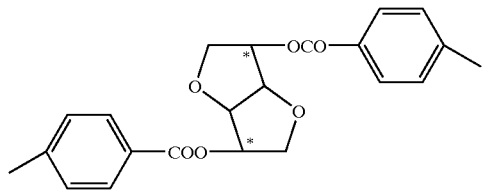
-continued

Besides those enumerated above, (meth) acrylate compounds having optically active groups can also be mixed in the same manner as for the above-numerated compounds as an ingredient in the liquid crystal composition of this invention. The symbol "*" in the chiral compounds mentioned above indicates an asymmetric carbon atom.

Because the cholesteric pitch determining the selective reflection wavelength is changed depending on the amount of the chiral compound added, the color based on the selective reflection wavelength can be regulated by regulating the amount of the chiral compound added. As the amount of the chiral compound blended is increased, the pitch is decreased, and the reflected light is shifted toward shorter wavelength. However, the alignment of the polymerizable liquid crystal compound in this invention to which the chiral compound is added in a large amount maybe lowered, and thus the amount of the chiral compound blended is preferably 30 parts by weight or less relative to 100parts by weight of the polymerizable liquid crystal compound. The amount is more preferably 20 parts by weight or less. To bring about a cholesteric phase, the amount of the chiral compound added is preferably 1 part by weight or more. The amount is more preferably 2 parts by weight or more.

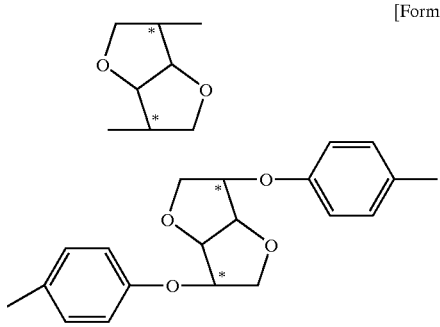
(4)

wherein $R_{26}$ represents a hydrogen atom or a methyl group; r, u, w, x, y and z each represent an integer of 0 to 10 provided that r+u+w>2, and x+y+z>2; each of α and β is 0 or 1; and D represents a divalent organic group containing an optically active carbon.

The divalent organic group D containing an optically active carbon includes, but is not limited to, those groups of the following formula 12:

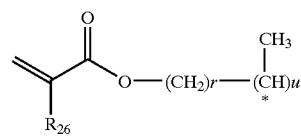
[Formula 12]

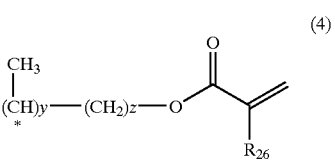

Multifunctional (meth) acrylate compounds having 2 or more (meth) acryloyloxy groups maybe added to the polymerizable liquid crystal compound of this invention in order to improve the heat resistance and solvent resistance of its cured product (liquid crystal alignment film). The multifunctional (meth)acrylate compounds are not particularly limited insofar as they do not deteriorate the liquid crystallizability and alignment of the polymerizable liquid crystal compound, and these (meth) acrylate compounds may be liquid crystal compounds or non-liquid crystal compounds.

The liquid crystal multifunctional (meth)acrylate compounds having 2 or more (meth) acryloyloxy groups used in this invention may be generally known liquid crystal diacrylate compounds or dimethacrylate compounds, but are preferably those compounds having a value of Δn/n as high as possible so that the resultant liquid crystal composition, or a film prepared by polymerizing the composition, can have a high value of Δn/n. The liquid crystal compound having two (meth) acryloyloxy groups includes those compounds represented by the general formula (5):

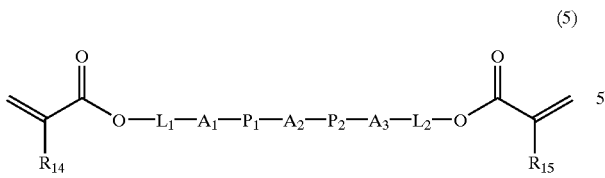

(5)

wherein $R_{14}$ and $R_{15}$ each represent a hydrogen atom or a methyl group; $L_1$ represents —$(CH_2)_d$— whereupon d is an integer of 0 to 10, —$(CH_2)_eO$— whereupon e is an integer of 1 to 10, or —$(CH_2CH_2O)_f$— whereupon d is an integer of 0 to 10, —$O(CH_2)_e$—whereupon e is an integer of 1 to 10, or —$(OCH_2CH_2)_f$— whereupon f is an integer of 0 to 3; $P_1$ and $P_2$ each represent —$CO_2$—, —O—, —OCO—, —CH=CH— or a single bond; and $A_1$, $A_2$ and $A_3$ each represent a para-substituted cyclic group.

The para-substituted cyclic groups $A_1$, $A_2$ and $A_3$ include the groups of formula 14:

[Formula 14]

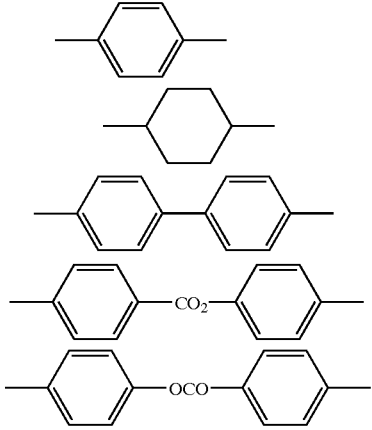

Each hydrogen atom on the para-substituted cyclic groups mentioned above may be replaced by a methyl group, methoxy group or fluorine atom.

The non-liquid crystal diacrylate compound having 2 or more (meth)acryloyloxy groups includes those compounds having (meth)acryloyloxy groups bound to one another via an aliphatic or aromatic hydrocarbon, as well as a wide variety of compounds ranging from polycyclic compounds as described in JP-A 11-130729 to those compounds having (meth) acryloyloxy groups bound to one another via or not via an alkylene spacer.

The non-liquid crystal compound having two (meth) acryloyloxy groups includes those compounds represented by the following general formula (6):

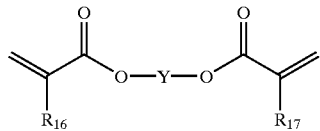

(6)

wherein Y represents a $C_{2-12}$ linear or branched alkylene group, and $R_{16}$ and $R_{17}$ each represent a hydrogen atom or a methyl group.

The non-liquid crystal compound having three (meth) acryloyloxy groups includes those compounds represented by the following general formula (7):

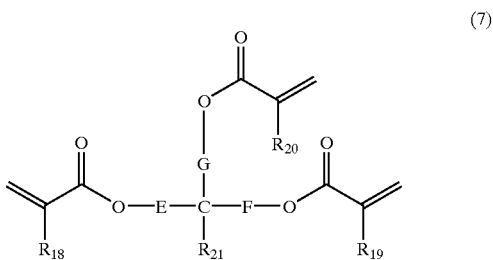

(7)

wherein E, F and G each represent $(CH_2)_g$—, —$(CH_2)_h$— or —$(CH_2)_i$— whereupon g, h of which are not simultaneously 0; $R_{18}$, $R_{19}$, and $R_{20}$ each represent a hydrogen atom or a methyl group; and $R_{21}$ represents a hydrogen atom or a $C_{1-4}$ alkyl group.

Besides the compounds described above, a large number of liquid crystal or non-liquid crystal compounds having 2 or more (meth)acryloyloxy groups are known, and these can also be used as the liquid crystal multifunctional (meth) acrylate compound to form the liquid crystal composition of this invention.

When the multifunctional (meth)acrylate compound having 2 or more (meth)acryloyloxy groups is added in a large amount, the alignment of the liquid crystal (meth)acrylate compound may be deteriorated, and thus the amount of the multifunctional (meth)acrylate compound blended is preferably 50 parts by weight or less relative to 100 parts by weight of the polymerizable liquid crystal composition of this invention. The amount is more preferably 30 parts by weight or less.

Further, the liquid crystal composition of this invention can be compounded if necessary with a wide variety of additives such as leveling agents for improving alignment or coatability onto a substrate, and inorganic, organic or metallic additives such as stabilizers and plasticizers.

The polymerizable liquid crystal compound, or the liquid crystal composition comprising e.g. a chiral compound added to the polymerizable liquid crystal compound, is applied onto an alignment film and then aligned by heating, followed by reacting the (meth)acryloyloxy groups thereof to fix the alignment structure to form a liquid crystal alignment film.

Coating of the alignment film with e.g. the liquid crystal composition maybe conducted in a hot melting system or by applying a solution thereof in an organic solvent. Usually, the composition is applied as a solution thereof in an organic solvent. Coating can be conducted with a suitable coater such as a bar coater, a spin coater and a roll coater. The organic solvent is not particularly limited insofar as the liquid crystal composition or the like can be dissolved therein, but a high-boiling point solvent is not preferable for productivity. As the organic solvent, methyl ethyl ketone, cyclohexanone or tetrahydrofuran is preferably used.

As the alignment film, a film known in the art can be used. For example, use is made of a rubbed film prepared by forming a film of polyimide, polyvinyl alcohol or the like on a substrate and then rubbing it with a rayon cloth, an oblique evaporated film, a light alignment film formed by irradiating a polymer such as cinnamate or azobenzene having photo-crosslinkable groups, or polyimide, with polarized UV rays, and a stretched film. Alternatively, it can be aligned by alignment in a magnetic or an electric field or by application of stress. The substrate makes use of a glass plate or a film made of plastics such as polyethylene terephthalate, triacetyl cellulose, norbornane resin, polyvinyl alcohol, polyimide, polyarylate, polycarbonate, polysulfone or polyether sulfone.

Heating alignment is conducted generally at a temperature of from the Cr (crystal phase)/N (nematic phase) transition temperature to the N (nematic phase)/I (isotropic phase) transition temperature of the liquid crystal composition. At higher temperatures, progress of thermal polymerization may prevent alignment, so heating alignment is conducted preferably at a temperature lower by up to +50° C. than the phase transition temperature of Cr/N. The time of heating alignment is not particularly limited, but is preferably in the range of about 10 seconds to 10 minutes.

The alignment structure is fixed through curing by reacting the polymerizable reactive groups in e.g. the liquid crystal composition, and curing is conducted preferably by irradiation with active energy rays. The active energy rays may be UV rays and electron rays, and in particular UV rays are preferable. In the case of irradiation with UV rays, the curing reaction can rapidly proceed by adding a photopolymerization initiator. The photopolymerization initiator includes, but is not limited to, benzoin ethers, benzophenones, acetophenones, and benzyl ketals. The amount of the photopolymerization initiator added is preferably 0.1 to 10% by weight, more preferably 0.3 to 5% by weight relative to the liquid crystal composition. After heating alignment, a certain kind of liquid crystal composition remains aligned without precipitating crystals even at a temperature of less than the Cr/N phase transition temperature, and in this case, the composition may be irradiated at room temperature with active energy rays. A composition easily crystallized at a lower temperature shall be irradiated with active energy rays at a temperature of higher than the Cr/N phase transition temperature.

The liquid crystal film thus formed on the substrate is used as an optical film. The resultant liquid crystal alignment film integrated with the substrate may be used directly for formation of an optical film, or the film may be used after transfer from the substrate to another substrate. It is usually preferable that the thickness of the liquid crystal alignment film is about 0.1 to 20 μm.

Specifically, the optical film includes e.g. a selective reflection film obtained from the liquid crystal composition comprising the chiral compound added to the polymerizable liquid crystal compound. The selective reflection film has a selective reflection wavelength width within the visible light range, and the selective reflection wavelength width can be changed by suitably adjusting the amount of the chiral compound used. The selective reflection wavelength width of the selective reflection film can be extended to the whole of the visible light range by a method of laminating a plurality of selective reflection films prepared with a varying amount of the chiral compound or by a method of coating the resultant selective reflection film with a solution of a liquid crystal composition having a different selective reflection wavelength width.

By laminating a retardation film on the selective reflection film, a cholesteric polarizer is obtained. The retardation film used is preferably a λ/4 plate such as, for example, a birefringent film made of a polymeric film subjected to stretching treatment and a liquid crystal alignment film having an optical anisotropic layer made of a liquid crystal material. As the materials for the stretched film used as λ/4 plate, those known in the art can be used without limitation, but polycarbonate, norbornane resin, polyvinyl alcohol etc. are preferable. The cholesteric polarizer can be prepared by a method of laminating the above selective reflection film via e.g. a pressure-sensitive adhesive onto a λ/4 plate or by a method of coating a λ/4 plate as the substrate with the liquid crystal composition, then heat-orienting and fixing it, and laminating a selective reflection film thereon.

The resultant optical film (liquid crystal alignment film) is used not only as the selective reflection film but also as a retardation film (optical compensation film), a twisted retardation film and a tilted retardation film. The retardation film can be obtained by heat-orienting the liquid crystal composition on an alignment film and fixing it. The twisted retardation film can be obtained by adding a small amount of the chiral compound to the liquid crystal composition. Depending on the amount of the chiral compound added, the angle of twist can be arbitrarily regulated. The tilted retardation film is obtained by using an optical alignment film obtained by tilted irradiation with polarized UV rays, and the tilt angle can be regulated according to the angle of irradiation and dose of polarized UV rays.

EXAMPLES

Hereinafter, this invention is described in more detail by reference to the Examples, which are not intended to limit this invention.

Example 1

Synthesis of 4-(4-cyanophenylethynyl)-2-fluorophenyl 4-(5-acryloyloxy-3-oxapentyloxy)benzoate (Exemplary Compound 20 in Table 1)

(i): Synthesis of 4-cyano-(3-hydroxy-3-methylbutynyl) benzene (Compound (VIII) [$R_1$, $R_2$, $R_3$, $R_4$ =H, $X_2$ =CN] in Scheme (2))

50 g (274.7 mmol) 4-bromobenzonitrile, 46.2 g (550 mmol) 3-methyl-1-butyne-3-ol, 0.97 g (1.38 mmol) bis (triphenylphosphine) dichloropalladium, 0.26 g (1.38 mmol) copper iodide and 2 g (7.6 mmol) triphenyl phosphine were added in a nitrogen stream, and 100 ml tetrahydrofuran (THF) and 20 ml triethylamine were added thereto, and the mixture was reacted at 80 ° C. for 15 hours. The reaction solution was concentrated and partitioned by adding 300 ml ethyl acetate and 300 ml water, and the organic layer was washed twice with 100 ml water and dried over magnesium sulfate anhydride. The solvent was distilled away, and about 250 ml heptane was added to the residual paste and stirred for a while, and the precipitated crystals were filtered to give 53.6 g crystals.

$^1$H—NMR(CDCl$_3$)δ: 1.62(s, 6H), 2.07(s, 1H), 3.85(s, 3H), 7.48(d, 2H), 7.59(d, 2H).

(ii): Synthesis of 4-cyanoethynyl benzene (Compound (X) [$R_1$, $R_2$, $R_3$, $R_4$=H; $X_2$=CN] in Scheme (2))

A mixture of 53.6 g of the alcohol derivative (compound (VIII)) obtained above in synthesis (i), 350 ml anhydrous toluene, and 11 g (274.7 mmol) ground sodium hydroxide was refluxed for 1.5 hours in a nitrogen stream with a Dean-Stark tube, then insolubles were filtrated off, and the filtrate was concentrated to give residual solids which were then dissolved in toluene, and after silica gel was added thereto, the mixture was stirred for a while, the silica gel was filtered off, and the filtrate was concentrated to give residues which were then suspended in heptane and filtered to give 22.13 g of the desired product. The overall recovery in (i) and (ii) was 63.4%.

$^1$H—NMR(CDCl$_3$)δ: 3.30(s, 1H), 7.54–7.65(m, 4H)

(iii): Synthesis of 4-bromo-2-fluoroacetoxybenzene (Compound (I) [$R_5$, $R_6$, $R_8$=H; $R_7$=F; LG=Br; PG=acetyl] in Scheme (2))

A mixture of 25 g (131 mmol) 4-bromo-2-fluorophenol, 200 ml toluene and 13.5 g (170.3 mmol) pyridine was chilled on ice, and 17.4 g (170.3 mmol) acetic anhydride was added dropwise thereto, and the mixture was stirred at room temperature for 1 hour. The reaction product was introduced into 200 ml water, extracted, washed twice with water and dried over magnesium sulfate anhydride, and the solution was concentrated and distilled under reduced pressure (53 to 54° C./mmHg), whereby 26.2 g of the desired product was obtained. The yield was 85.8%.

(iv): Synthesis of 4-(4-cyanophenylethynyl)-2-fluoroacetoxybenzene (Compound (V) [$R_1$, $R_2$, $R_3$, $R_4$, $R_5$, $R_6$, $R_8$ =H; $R_7$=F; $X_2$ =CN; PG=acetyl] in Scheme (2))

16 g (68.7 mmol) of the bromo-derivative (compound (I)) obtained above in synthesis (iii), 10 g (78.7 mmol) of the acetylene derivative (compound (X)) obtained above in synthesis (ii), 0.5 g (0.71 mmol) of bis(triphenyl phosphine) dichloropalladium, 0.14 g (0.73 mmol) copper iodide, and 1 g (3.8 mmol) triphenyl phosphine were added in a nitrogen stream, and 140 ml THF and 200 ml triethylamine were added thereto, and the mixture was reacted at 80° C. for 24 hours. The reaction solution was concentrated and partitioned by adding ethyl acetate and water, and the organic layer was washed twice with water and dried over magnesium sulfate anhydride. After the solvent was distilled away, 23.7 g residual solids were dissolved in 300 ml toluene, and after 14 g silica gel was added, the mixture was stirred for 30 minutes. The silica gel was filtered off, and the silica gel on the filter paper was washed with 100 ml toluene, and the filtrate was concentrated to give solids, and 150 ml ethyl acetate and 1000 ml heptane were added thereto, and the mixture was left overnight in a freezer, and the precipitates were filtered to give 13.3 g of the desired product. The yield was 63.4%.

$^1$H—NMR(CDCl$_3$)δ:2.35(s, 3H), 7.12, 7.17(dd, 1H, J=8.6 Hz), 7.29–7.32(m, 1H), 7.35–7.37(m, 1H), 7.62(d, 4H)

(v): Synthesis of 4-(4-cyanophenylethynyl)-2-fluorohydroxybenzene (Compound (VII) [$R_1$, $R_2$, $R_3$, $R_4$, $R_5$, $R_6R_8$=H; $R_7$ =F; $X_2$=CN] in Scheme (1))

A solution of 13.1 g (95.2 mmol) potassium carbonate in 40 ml water was added to a mixture of 13.3 g (47.6 mmol) of the acetyl derivative (compound (V)) obtained above in synthesis (iv), 80 ml THF and 20 ml methanol, and the resultant mixture was stirred at room temperature for 16 hours. The reaction solution was adjusted to pH 4 with 20% hydrochloric acid, partitioned with ethyl acetate, washed twice with water and dried over magnesium sulfate anhydride. The solvent was concentrated, and the resultant residues, 12 g, were dissolved in 84 ml toluene under reflux, then re-precipitated with heptane and filtered to give 9.1 g of the desired product. The yield was 77.6%.

$^1$H—NMR(CDCl$_3$)δ: 6.99, 7.01(dd, 1H), 7.29–7.32(m, 1H), 7.24–7.29(m, 1H), 7.58(d, 2H), 7.63(d, 2H).

(vi): Synthesis of 4-(5-acryloyloxy-3-oxapentyloxy) benzoic acid (Compound (XIV) [$R_9$, $R_{10}$, $R_{11}$, $R_{12}$, $R_{13}$ =H; $X_1$ =—(CH$_2$CH$_2$O)$_2$—]in Scheme (3))

104.9 g (842.5 mmol) 2-chloroethoxyethanol, 500 ml dimethylformamide (DMF), 70 g (421.2 mmol) ethyl 4-hydroxybenzoate, and 116.3 g (842.5 mmol) potassium carbonate were introduced into a flask in a nitrogen stream and stirred at 80° C. for 17 hours. The insolubles were filtered off, and the filtrate was concentrated, then introduced into a saline solution, extracted with ethyl acetate, washed with water and dried over magnesium sulfate anhydride, and the solution was concentrated to give 119 g crude ethyl 4-(2-hydroxyethoxy)benzoate. Subsequently, 150 ml ethanol and 200 ml aqueous solution of 33.7 g sodium hydroxide were added thereto, and the mixture was stirred at 70° C. for 2 hours. After the reaction solution was left and cooled, 72 ml conc. hydrochloric acid was added thereto on an iced bath, and the precipitates were filtered, and washed with water to give 89 g (76.2 mmol) 4-(5-hydroxy-3-oxapentyloxy) benzoic acid (compound (XIII) [$R_9$, $R_{10}$, $R_{11}$, $R_{12}$=H; $X_1$=—(CH$_2$CH$_2$O)$_2$—] in scheme (3)). Then, 800 ml toluene, 76.5 g (1060 mmol) acrylic acid and 10.1 g(53mmol)p-toluenesulfonicacidmonohydrate(referred to hereinafter as "PTSA") were added thereto, and the mixture was esterified for 3 hours in a Dean-Stark tube. The insolubles were filtered, and washed with toluene, then suspended in water, filtered and dried to give 86 g of the desired product. The yield was 78%.

$^1$H—NMR(CDCl$_3$)δ: 3.82(t, 2H, J=4.6 Hz), 3.89(t, 2H, J=4.6 Hz), 4.42(t, 2H, J=4.6 Hz), 4.35(t, 2H, J=4.6 Hz), 5.81, 5.86(dd, 1H), 6.10, 6.14, 6.18, 6.23(qs, 1H), 6.40, 6.50(dd, 1H), 6.96(d, 2H, J=8.8 Hz), 8.04(d, 2H, J=8.8 Hz).

(vii): Synthesis of 4-(4-cyanophenylethynyl)-2-fluorophenyl 4-(5-acryloyloxy-3-oxapentyloxy)benzoate (Exemplary Compound 20 in Table 1)

6.25 g (30.4 mmol) N,N'-dicyclohexylcarbodiimide (referred to hereinafter as DCC) and 0.04 g (0.3 mmol) 4-dimethyl aminopyridine (referred to hereinafter as DMAP) were added to a mixture of 5 g (21.1 mmol) of the phenol derivative (Compound (VII)) obtained above in synthesis (v), 7.09 g (25.3 mmol) of 4-(5-acryloyloxy-3-oxapentyloxy) benzoic acid (compound (XIV)) obtained above in synthesis (vi), 300 ml dichloromethane and 50 ml THF, and the mixture was stirred at room temperature for 15 hours. The precipitates were filtered off, and the filtrate was concentrated to give residues which were then purified by a silica gel column (toluene/ethyl acetate =10/1 (ratio by volume)) to give 8.5 g product, and this product was recrystallized from 40 ml ethanol to give 7.0 g of the desired product. The yield was 66.5%.

$^1$H—NMR(CDCl$_3$)δ: 3.17(t, 2H, J=4.78 Hz), 3.92(t, 2H, J=4.8 Hz), 4.24(t, 2H, J=4.8 Hz), 4.37(t, 2H, J=4.8 Hz), 5.84–5.86(m, 1H), 6.13–6.18(m, 1H), 6.42–6.45(m, 1H), 7.02(d, 2H,J=9.0 Hz),7.28(m, 1H),7.36–7.40(m, 2H),7.63(d, 2H,J=8.6 Hz), 7.66(d, 2H, J=8.6 Hz), 8.15(d, 2H, J=9.0 Hz)

The phase transition temperature from the crystal phase to the nematic phase of the resultant exemplary compound 20 was 89 ° C., and the phase transition temperature from the nematic phase to the isotropic phase thereof was 183 ° C. (phase transition temperature: Cr 89 N 183 I). The refractive index anisotropy (referred to hereinafter as Δn) was 0.31. For measurement of Δn, the exemplary compound 20 was dissolved at a concentration of 15% by weight in liquid crystal ZLI-1132 produced by Merk, and the retardation thereof was measured under a polarizing microscope (using an interference filter ($\gamma_{max}$=595 nm) with a halogen lamp as the light source) and then extrapolated to determine Δn at a concentration of 100% by weight. To determine "n" for calculation of Δn/n, "no" was measured, and n was determined using the equation: n=(2 no+ne)/3 wherein ne=no+Δn. The measurement in the Examples below was conducted in an analogous manner.

Examples 2 to 11

The exemplary liquid crystal (meth)acrylate compounds shown in Table 2 were synthesized in the same manner as in Example 1. The phase transition temperatures, Δn values, and Δn/n values of the resultant liquid crystal (meth)acrylate compounds are shown in Table 2.

TABLE 2

| Examples | Exemplary compounds | Phase transition temperature (° C.) | | | | | | Δn value | Δn/n value |
|---|---|---|---|---|---|---|---|---|---|
| 1 | 20 | Cr | 89 | N | 183 | I | | 0.31 | 0.19 |
| 2 | 3 | Cr | 99 | N | 218 | I | | 0.33 | 0.20 |
| 3 | 2 | Cr | 112 | N | 228 | I | | 0.35 | 0.21 |
| 4 | 30 | Cr | 81 | N | 165 | I | | 0.28 | 0.17 |
| 5 | 7 | Cr | 86 | N | 204 | I | | 0.32 | 0.19 |
| 6 | 15 | Cr | 80 | N | 135 | I | | 0.27 | 0.17 |
| 7 | 10 | Cr | 77 | N | 191 | I | | 0.30 | 0.18 |
| 8 | 4 | Cr | 94 | N | 171 | I | | 0.31 | 0.19 |
| 9 | 21 | Cr | 100 | N | 155 | I | | 0.29 | 0.18 |
| 10 | 19 | Cr | 102 | N | 191 | I | | 0.30 | 0.18 |
| 11 | 28 | Cr | 112 | N | 157 | I | | 0.27 | 0.17 |

Example 12

Synthesis of 4-(4-cyano-3-fluorophenylethynyl)phenyl 4-(5-acryloyloxy-3-oxapentyloxy)benzoate (Exemplary Compound 18 in Table 1)

(i): Synthesis of 2-fluoro-4-trifluoromethanesulfonylbenzonitrile (Compound (IV) [$R_1$ =F; $R_2$, $R_3$, $R_4$ =H; $X_2$ =CN; LG =OTf] in Scheme (1))

9.89 g (72.1 mmol) 2-fluoro-4-hydroxybenzonitrile was dissolved in a mixed solvent of 100 ml toluene and 10 ml THF in a nitrogen atmosphere, and 8.56 g (108.2 mmol) pyridine was added. 24.4 g (86.5 mmol) trifluoromethanesulfonic acid anhydride was added dropwise thereto under cooling on ice, and the mixture was stirred for 2.5 hours. The reaction was terminated by adding aqueous saturated sodium bicarbonate, and the product was extracted with ethyl acetate. The organic phase was washed with aqueous saturated saline, dried over magnesium sulfate anhydride, concentrated, and purified by silica gel chromatography (hexane/ethyl acetate=4/1 (ratio by volume)) to give 19.1 g of the desired product. The yield was 98%.

$^1$H—NMR(CDCl$_3$)δ:7.24(m, 2H), 7.81(m, 1H).

(ii): Synthesis of 2-fluoro-4-[4-(2-tetrahydropyranyloxy)phenyl]ethynyl benzonitrile (Compound (V) [$R_1$ =F, $R_2$, $R_3$, $R_4$ $R_5$, $R_6$, $R_7$, $R_8$=H; $X_2$ =CN; PG=THP] in Scheme (1))

8.11 g (40.1 mmol) 1-ethynyl-4-tetrahydropyranyloxy benzene (compound (III) [$R_5$, $R_6$, $R_7$, $R_8$=H; PG=THP] in scheme (1)), 231.6 mg (0.33 mmol) PdCl$_2$ [P(H$_6$H$_5$)$_3$], 4328 g (1.65 mmol) triphenyl phosphine and 125.7 mg (0.66 mmol) copper iodide (I) were dissolved in 100 ml triethylamine in a nitrogen atmosphere, and a solution of 8.99 g (33.4 mmol) triflate (compound (IV)) obtained above in synthesis (i) in 20 ml triethylamine was added dropwise thereto at room temperature. The mixture was heated at 80° C. for 2.5 hours, and the reaction was terminated by adding aqueous saturated ammonium chloride, and the product was extracted with ethyl acetate, and the organic layer was washed with water. The solution was dried over magnesium sulfate anhydride, concentrated and recrystallized from hexane/ethyl acetate to give 9.23 g of the desired product. The yield was 86%.

$^1$H—NMR(CDCl$_3$)δ: 1.61(m, 1H), 1.69(m, 2H), 1.88(m, 2H), 2.02(m, 1H), 3.62(m, 1H), 3.87(m, 1H), 5.46(t, 1H), 7.05(m, 2H), 7.31(m, 2H), 7.46(m, 4H), 7.57(m, 1H).

(iii): Synthesis of 2-fluoro-4-(4-hydroxyphenyl)ethynylbenzonitrile (Compound (VII) [$R_1$=F; $R_2$, $R_3$, $R_4$, $R_5$, $R_6$, $R_7$, $R_{b\,8}$=H; $X_2$=CN] in Scheme (1))

9.22 g (28.7 mmol) of compound (V) obtained above in synthesis (ii) and 55.2 mg (0.29 mmol) PTSA were dissolved in a mixed solvent of 50 ml chloroform and 5 ml methanol, and the mixture was heated under reflux for 30 minutes. After cooling, aqueous saturated sodium bicarbonate was added, and the product was extracted with chloroform and dried over magnesium sulfate anhydride. After concentration, the concentrate was recrystallized from hexane/ethyl acetate to give 4.89 g of the desired product. The yield was 72%.

$^1$H—NMR(CDCl$_3$)δ: 6.80(m, 2H), 7.41(m, 4H), 7.70(m, 1H)

(iv): Synthesis of 4-(4-cyano-3-fluorophenylethynyl)phenyl 4-(5-acyloyloxy-3-oxapentyloxy)benzoate (Exemplary Compound 18 in Table 1)

7.25 g (24.6 mmol) compound (XIV) ($R_9$, $R_{10}$, $R_{11}$, $R_{12}$, $R_{13}$=H; $X_1$=—(CH$_2$CH$_2$O)$_2$—) and 4.87 g (20.5 mol) compound (VII) obtained above in synthesis (iii) were dissolved in 300 ml 1,2-dichloroethane in a nitrogen atmosphere, and 5.50 g (26.7 mmol) DCC and 1.26g (10.3mmol) DMAP were added at room temperature, and the mixture was stirred overnight. The precipitated solids were filtered off, and the filtrate was concentrated and purified by column chromatography (chloroform/ethyl acetate=50:1 to 20:1 (ratio by volume)) and recrystallized from ethanol to give 6.97 g of the desired product. The yield was 68%.

$^1$H—NMR(CDCl$_3$)δ: 3.75(m, 2H), 3.83(m, 2H), 4.15(m, 2H), 4.28(m, 2H), 5.76(dd, 1H), 6.08(dd, 1H), 6.35(dd, 1H), 6.93(m, 2H), 7.17(m, 2H), 7.26(m, 1H), 7.31(m, 1H), 7.51(m, 3H), 8.06(m, 2H).

The phase transition temperature from the crystal phase to the nematic phase of the resultant exemplary compound 18 was 69° C., and the phase transition temperature from the nematic phase to the isotropic phase thereof was 171° C. The Δn value was 0.30, and the Δn/n value was 0.18.

Examples 13 to 14

The exemplary liquid crystal acrylate compounds shown in Table 3 were synthesized in the same manner as in Example 12. The phase transition temperatures, Δn values, and Δn/n values of the resultant liquid crystal acrylate compounds are shown in Table 3.

TABLE 3

| Examples | Exemplary compounds | Phase transition temperature (° C.) | | | | | | Δn value | Δn/n value |
|---|---|---|---|---|---|---|---|---|---|
| 12 | 18 | Cr | 69 | N | 171 | I | | 0.30 | 0.18 |
| 13 | 17 | Cr | 89 | N | 145 | I | | 0.27 | 0.17 |
| 14 | 27 | Cr | 64 | N | 134 | I | | 0.26 | 0.16 |

Example 15

(Preparation of a Solution of a Liquid Crystal Composition)

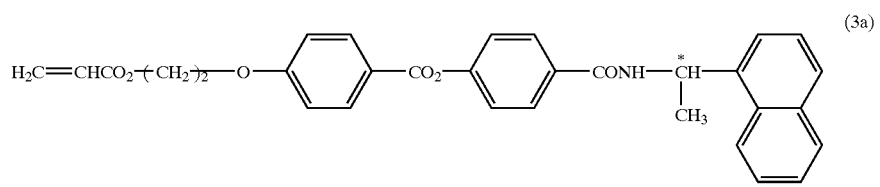

(3a)

The liquid crystal acrylate compound (exemplary compound 18) and the chiral acrylate compound (3a) shown above were dissolved in the ratio of (Exemplary Compound 18) : (3a)=80:20 in methyl ethyl ketone, and Irugacure 907 (Ciba Specialty Chemicals Ltd.) was added as a photopolymerization initiator in an amount of 3 parts by weight relative to 100 parts by weight of the solids (total of (exemplary compound 18) and (3a)), whereby a liquid crystal composition was prepared in the form of a solution.
(Preparation of An Alignment Film)
Polyvinyl alcohol was applied onto a triacetyl cellulose film, to form a coating of 0.1 μm in thickness (thickness after drying) on the film and then rubbed to prepare an alignment film.
(Preparation of Alignment Films)
The solution of the liquid crystal composition was applied by a bar coater onto the alignment film and heat-treated at 90° C. for 1 minute, whereby the organic solvent was evaporated and the liquid crystal composition was aligned. Thereafter, the liquid crystal composition was cured by irradiation with 1500 mJ/cm² UV rays from a high-pressure mercury lamp, to fix the alignment. The resultant alignment film had a selective reflection central wavelength at λ=550 nm. The selective reflection wavelength width (Δλ) was 99 nm.
In the same manner, a liquid crystal alignment film was prepared from a solution of a liquid crystal composition containing the liquid crystal acrylate compound (exemplary compound 18) and the chiral compound (3a) in the ratio of 76:24. The resultant liquid crystal alignment film showed λ=463 nm and Δλ=84 nm. Another liquid crystal alignment film was prepared in the same manner from a solution of a liquid crystal composition containing the liquid crystal acrylate compound (exemplary compound 18) and the chiral compound (3a) in the ratio of 83:17. The resultant liquid crystal alignment film showed λ=654 nm and Δλ=118 nm. The selective reflection central wavelength (λ) and the selective reflection wavelength width (Δλ) were determined from a reflection spectrum taken by a spectrophotometer. All the 3 films showed Δλ/λ=Δn/n=0.18 or more.
These 3 liquid crystal alignment films were laminated via a pressure-sensitive adhesive to give a film showing selective reflection in the broad range of 420 to 710 nm.
(Preparation of a Cholesteric Polarizer)
A cholesteric polarizer was prepared by laminating a retardation film having a retardation of 135nm on the broad-range selective reflection film prepared above. The resultant polarizer was arranged on a backlight for liquid crystal display, and after a polarizing plate with the axis of polarization parallel thereto was arranged over it, the polarizer was measured by a luminance meter (BM-7 manufactured by Minolta), indicating luminance which was about 1.4 times higher than when only the polarizing plate was arranged on the backlight.

Example 16
(Preparation of a Retardation Film)
The liquid crystal acrylate compound (exemplary compound 20) was dissolved in methyl ethyl ketone, and Irugacure 907 (Ciba Specialty Chemicals) was added as a photopolymerization initiator in an amount of 3 parts by weight relative to 100 parts by weight of the solid (exemplary compound 20) to prepare a liquid crystal composition. Using this solution, a liquid crystal alignment film was prepared in the same manner as in Example 1. The liquid alignment film thus obtained showed a retardation of 430nm. This alignment film functioned as a retardation plate for color compensation of STN-LCD.

Comparative Example 1

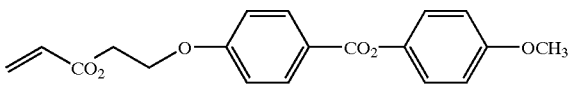

[Formula 18]

Three kinds of liquid crystal alignment films were prepared in the same manner as in Example 15 except that a liquid crystal acrylate compound (phase transition temperature: Cr 80 N 105 I) shown in formula 18 above was used in place of the exemplary compound 18 in Example 15. The resultant liquid crystal alignment films showed the following selective reflection central wavelengths (λ) and selective reflection wavelength widths (Δλ):λ=455 nm, Δλ=46 nm; λ=547 nm, Δλ=57 nm; and λ=650 nm, Δλ=68 nm, respectively. All the 3 films showed Δλ/λ=Δn/n=about 0.10.

A cholesteric polarizer was prepared by laminating these 3 liquid crystal alignment films via a pressure-sensitive adhesive onto a retardation film, and then evaluated in the same manner as above, indicating luminance which was about 1.1 times higher than when only the polarizing plate was arranged on the backlight.

Comparative Example 2

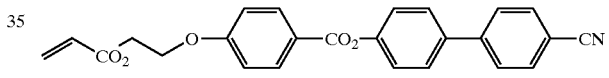

[Formula 19]

Preparation of a liquid crystal alignment film was attempted in the same manner as Example 15 except that a liquid crystal acrylate compound (phase transition temperature: Cr 154 N213 I) shown in formula 19 above was used in place of the exemplary compound 18 in Example 15, and 1,1,2,2-tetrachloroethane was used as the solvent. However, the solubility of the liquid crystal acrylate compound was low, and the resultant composition was significantly repelled upon heat treatment at the liquid crystal temperature (160° C.), thus failing to form a coating. The liquid crystal composition was aligned by sandwiching it between two glass plates each having an alignment film formed thereon. The selective reflection central wavelength (λ) and selective reflection wavelength width (Δλ) thereof were λ=556 nm and Δλ=101 nm, and the film showed Δλ/λ=Δn/n=0.18.

What is claimed is:
1. A polymerizable liquid crystal compound comprising at least one polymerizable reactive group and showing nematic liquid crystal properties, wherein said compound has a Δn/n value of 0.14 or more wherein n is average refractive index and Δn is extraordinary light refractive index (ne) minus ordinary light refractive index (no), and is aligned by application onto an alignment film, and wherein said compound includes a liquid crystal (meth)acrylate compound represented by the general formula (2):

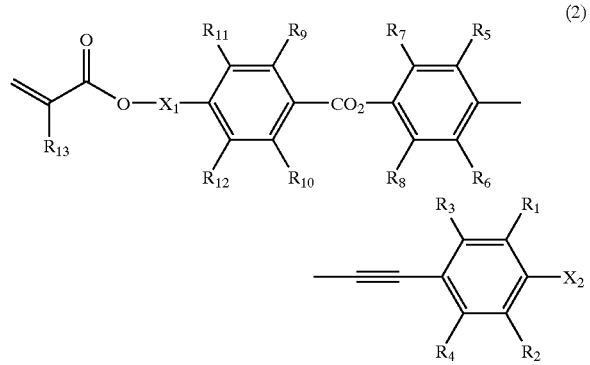

(2)

wherein $R_1$ to $R_{12}$ are the same or different and each represent —F, —H, —CH$_3$, —C$_2$H$_5$ or —OCH$_3$; $R_{13}$ represents —H or —CH$_3$; $X_1$ represents a bifunctional group represented by the formula —(CH$_2$CH$_2$O)$_a$(CH$_2$)$_b$(O)$_c$— wherein a is an integer of 0 to 3, b is an integer of 0 to 12, and c is 0 or 1 provided that when a is an integer of 1 to 3, b is 0 and c is 0 and when a is 0, b is an integer of 1 to 12, and c is 1; and $X_2$ represents —CN or —F, with the proviso that when $X_1$ is —(CH$_2$)$_2$O— and $X_2$ is —CN, not all one of $R_1$ to $R_{12}$ is —H.

2. A liquid crystal composition comprising the polymerizable liquid crystal compound of claim 1.

3. A liquid crystal composition comprising the polymerizable liquid crystal compound of claim 1 and a chiral compound.

4. The liquid crystal composition according to claim 2, further comprising a multifunctional (meth)acrylate compound having two or more (meth)acryloyloxy groups.

5. The liquid crystal composition according to claim 3, further comprising a multifunctional (meth)acrylate compound having two or more (meth)acryloyloxy groups.

6. A liquid crystal composition for producing a cholesteric liquid crystal film, wherein said composition comprises the polymerizable liquid crystal compound of claim 1, a multifunctional (meth)acrylate compound having two or more (meth)acryloyloxy groups and a chiral compound.

7. A cholesteric liquid crystal composition for circular-dichroic optics, wherein said composition comprises the polymerizable liquid crystal compound of claim 1, a multifunctional (meth)acrylate compound having two or more (meth)acryloyloxy groups and a chiral compound.

8. An optical film consisting of a liquid crystal alignment film produced by coating an alignment film with the polymerizable liquid crystal compound of claim 1, heat-aligning it and allowing (meth)acryloyloxy groups thereof to react in order to fix the alignment structure.

9. A selective reflection film consisting of a liquid crystal alignment film produced by coating an alignment film with the liquid crystal composition of claim 3.

10. A cholesteric polarizer produced by laminating the selective reflection film of claim 9 on a retardation film.

11. A liquid crystal display comprising the optical film of claim 8 integrated therein.

12. An optical film consisting of a liquid crystal alignment film produced by coating an alignment film with the liquid crystal composition of claim 2, heat-aligning it and allowing (meth)acryloyloxy groups thereof to react in order to fix the alignment structure.

13. An optical film consisting of a liquid crystal alignment film produced by coating an alignment film with the liquid crystal composition of claim 3, heat-aligning it and allowing (meth)acryloyloxy groups thereof to react in order to fix the alignment structure.

14. An optical film consisting of a liquid crystal alignment film produced by coating an alignment film with the liquid crystal composition of claim 4, heat-aligning it and allowing (meth)acryloyloxy groups thereof to react in order to fix the alignment structure.

15. An optical film consisting of a liquid crystal alignment film produced by coating an alignment film with the liquid crystal composition of claim 5, heat-aligning it and allowing (meth)acryloyloxy groups thereof to react in order to fix the alignment structure.

16. An optical film consisting of a liquid crystal alignment film produced by coating an alignment film with the liquid crystal composition of claim 6, heat-aligning it and allowing (meth)acryloyloxy groups thereof to react in order to fix the alignment structure.

17. An optical film consisting of a liquid crystal alignment film produced by coating an alignment film with the liquid crystal composition of claim 7, heat-aligning it and allowing (meth)acryloyloxy groups thereof to react in order to fix the alignment structure.

18. A selective reflection film consisting of a liquid crystal alignment film produced by coating an alignment film with the liquid crystal composition of claim 5.

19. A cholesteric polarizer produced by laminating the selective reflection film of claim 18 on a retardation film.

20. A liquid crystal display comprising the optical film of claim 9 integrated therein.

21. A liquid crystal display comprising the optical film of claim 18 integrated therein.

22. A liquid crystal display comprising the optical film of claim 10 integrated therein.

23. A liquid crystal display comprising the optical film of claim 19 integrated therein.

24. A liquid crystal display comprising the optical film of claim 12 integrated therein.

25. A liquid crystal display comprising the optical film of claim 13 integrated therein.

26. A liquid crystal display comprising the optical film of claim 14 integrated therein.

27. A liquid crystal display comprising the optical film of claim 15 integrated therein.

28. A liquid crystal display comprising the optical film of claim 16 integrated therein.

29. A liquid crystal display comprising the optical film of claim 17 integrated therein.

30. The polymerizable liquid crystal compound according to claim 1, wherein in the general formula (2), at least one of $R_1$ to $R_{12}$ represents —F.

* * * * *